United States Patent [19]

Genfan

[11] Patent Number: 5,042,828

[45] Date of Patent: Aug. 27, 1991

[54] BICYCLE

[75] Inventor: German S. Genfan, Worcester, Mass.

[73] Assignees: Charles W. Tardanico; Guy A. Tardanico, both of Stoughton, Mass.; a part interest

[21] Appl. No.: 406,055

[22] Filed: Sep. 5, 1989

[51] Int. Cl.⁵ ................................. B62M 1/18
[52] U.S. Cl. ..................... 280/226.1; 280/253; 272/73; 74/70
[58] Field of Search ........... 280/210, 220, 221, 226.1, 280/227; 253, 255, 1.194, 244, 256, 258, 233, 242.1; 272/73; 74/70

[56] References Cited

U.S. PATENT DOCUMENTS

| | | | |
|---|---|---|---|
| 456,989 | 8/1891 | Hanson | 280/226.1 |
| 529,717 | 11/1894 | Deacon | 280/226.1 |
| 593,678 | 11/1897 | Neider | 280/291 |
| 775,403 | 11/1904 | Kaplan | 280/226.1 |
| 894,544 | 7/1908 | Simon | 280/226.1 |
| 911,169 | 6/1989 | Schmit | 280/226.1 |
| 4,135,409 | 1/1979 | Ishimura | 280/253 X |
| 4,162,797 | 7/1979 | McBride | 280/226.1 X |
| 4,335,542 | 8/1890 | Schaefer | 280/226.1 |
| 4,354,691 | 10/1982 | Saunders et al. | 280/244 X |
| 4,653,766 | 3/1987 | Guandalini | 280/226.1 |
| 4,694,708 | 9/1987 | Hartmann | 280/260 |
| 4,829,841 | 5/1989 | Ogawa | 280/253 X |

Primary Examiner—Charles A. Marmor
Assistant Examiner—Mitchell Bompey
Attorney, Agent, or Firm—George W. Neuner

[57] ABSTRACT

In the bicycle disclosed herein, the axle of a driving wheel is journaled in a yoke at one end of an elongate frame and a steerable wheel is mounted at the other end of the frame. A rocking column is pivotally mounted on the frame for rotation around an axis which is concentric with the driving wheel axle, a backed seat being mounted on the other end of the column. The high speed element of a concentric speed transforming mechanism is connected to the axle and the low speed element is connected to the rocking column.

6 Claims, 2 Drawing Sheets

BICYCLE

BACKGROUND OF THE INVENTION

The present invention relates to a bicycle and more particularly to a bicycle which is driven by pushing back against a seat which is mounted on a column pivotable around an axis concentric with the axle of the driving wheel of the bicycle.

In most conventional bicycles, the seat or saddle is fixedly mounted on the bicycle frame and the bicycle is driven by rotating a pedal crank with the legs. Thus, essentially only the bicyclist's leg muscles work during riding. Stomach and back muscles are essentially unutilized because the upper portion of the cyclist's body is essentially fixed on an immovable seat. Even if the cyclist stands on his pedals, his stomach and back muscles do practically no work because they did not transfer any load, i.e. there is no rest against the cyclist's back. While a variety of unconventional bicycles have been proposed at various times, including some which utilize a rocking or sliding seat, these have not found acceptance, presumably because of the use of awkward, heavy and fragile driving linkages which are not concentric and which do not provide an appropriate driving ratio.

Among the several objects of the present invention may be noted the provision of a bicycle which utilizes more of the cyclist's muscles; the provision of such a bicycle which incorporates a fixed footrest and a movable backstop against which the cyclist works during driving the bicycle; the provision of a bicycle which is capable of high speed and efficient operation; the provision of such a bicycle which is especially useful in the development of a cyclist's stomach and back muscles and which yields the most complete usage of such muscles during competition; the provision of such a bicycle which is highly reliable and which is of relatively simple and inexpensive construction. Other objects and features will be in part apparent and in part pointed out hereinafter.

SUMMARY OF THE INVENTION

A bicycle constructed in accordance with the present invention employs an elongate frame having at one end a yoke for receiving the axle of a driving wheel. A steerable wheel is mounted at the other end of the frame. A rocking column is pivotally mounted on the frame for rotation around an axis which is concentric with the driving wheel axle and a seat is mounted on this column. The high speed element of a concentric speed transforming means is connected to the axle and the low speed element of the transforming means is connected to the rocking column.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
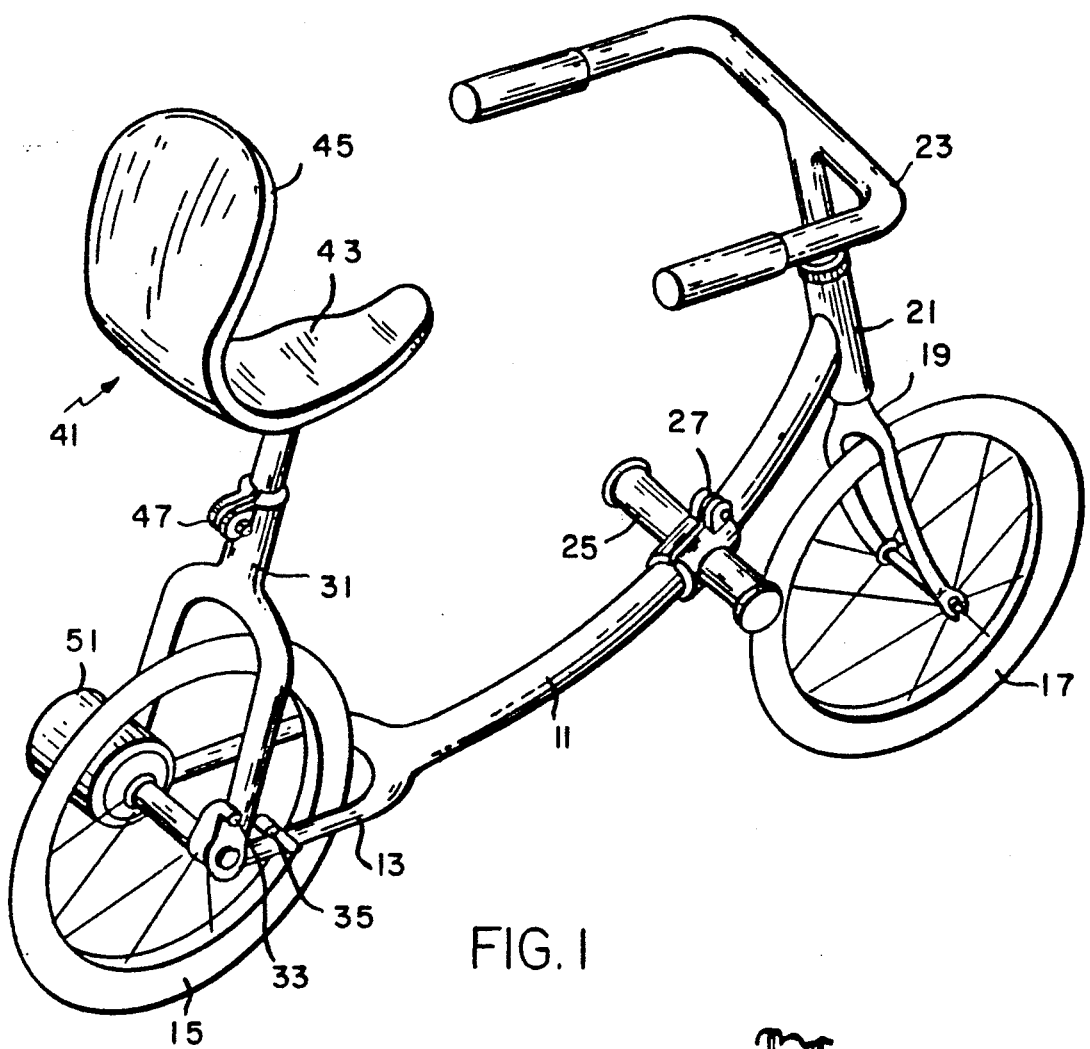
FIG. 1 is a perspective view of a bicycle constructed in accordance with the present invention.

Referring now to FIG. 1, the bicycle illustrated there employs an elongate frame 11 having, at one end, a yoke 13 which is adapted for receiving the axle of a driving wheel, such a driving wheel being indicated generally by reference character 15. A steerable front wheel 17 is mounted at the other end of the frame by means of a pivotable yoke 19 having a stem which extends through a tube 21 at the front end of the frame to handlebars 23 in conventional manner. Each of the wheels is preferably provided with caliper brakes (not shown) in conventional fashion. A footrest 25 is adjustably mounted on the frame 11 by means of a clamp assembly 27.

A rocking column 31 is pivotally mounted on the frame 11 for rotation around an axis concentric with the axle of the driving wheel 15, the extent to which the column may be rocked being limited by stops 33 and 35 extending from the frame. A seat 41 providing a saddle or base portion 43 and a back portion 45 is mounted on the upper end of a column 31, the height of the seat being adjustable by means of a clamp mechanism 47.

Figure 2:
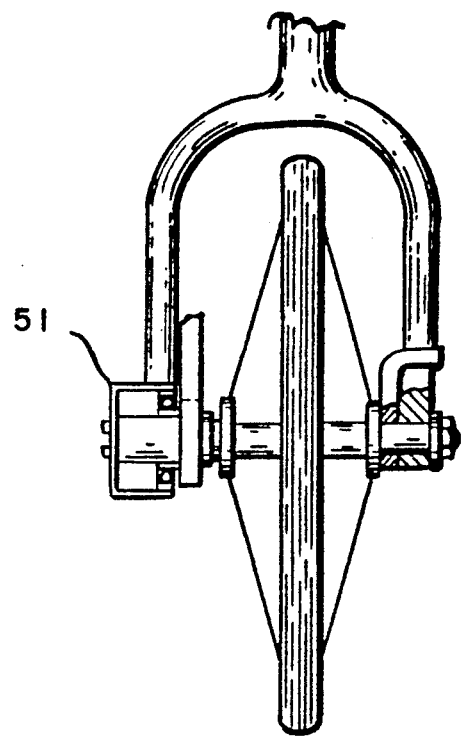
FIG. 2 is a back view, with parts broken away, of the rear wheel of the bicycle of FIG. 1.

As indicated previously, the bicycle of the present invention is driven by repeatedly pressing back against the seat 41, working against both the footrest 25 and the handlebars 23 so that a wide variety of muscles are employed in generating the movement. To direct the application of this effort to the driving wheel 15, the bicycle of the present invention employs a concentric speed transforming means in the nature of a harmonic drive. The harmonic drive is indicated generally by reference character 51 in FIGS. 1 and 2 and is shown in somewhat greater detail in FIG. 3. While a harmonic drive is the preferred type of concentric drive mechanism for use in the present invention, a planetary gear system might also be used since it can also provide concentric operation with fair high ratios available.

Figure 3:
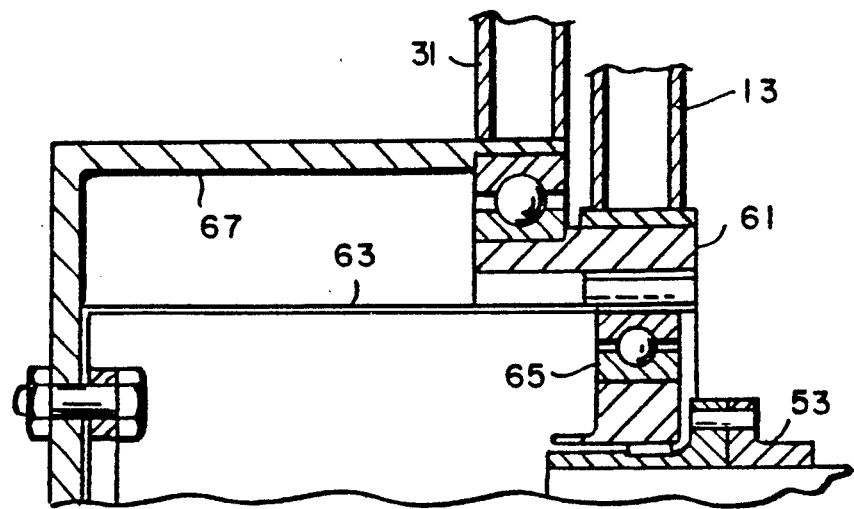
FIG. 3 is a sectional view through a portion of a concentric speed transforming mechanism employed in the bicycle of FIGS. 1 and 2.
Figure 4:
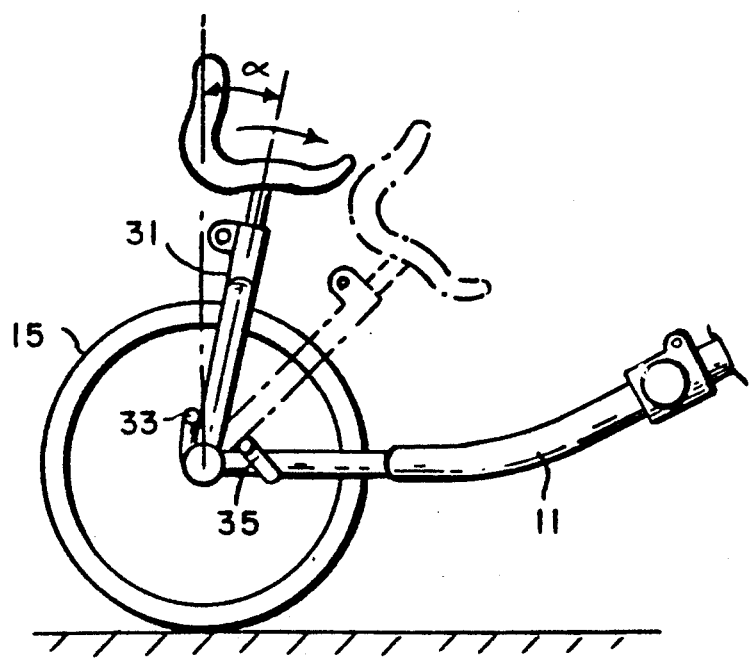
FIG. 4 is a diagram illustrating the movement of a rocking column and seat arrangement employed in the bicycle of FIGS. 1 and 2.

With reference to FIG. 3, an extension of the axle of the rear wheel 15 is indicated generally by reference character 53. Axle extension 53 is preferably coupled to the hub of wheel 15 through a one-way drive or ratchet in conventional manner, just as is the sprocket in a conventional chain-driven bicycle. The axle extension 53 is connected to the high speed element of the harmonic drive as described in greater detail hereinafter.

While harmonic drives are fairly well known in certain mechanical fields and are available commercially, e.g. from the Harmonic Drive division of Quincy Technologies, Inc. of Wakefield, Mass., it is appropriate to include a general description of the mode of operation. A principal characteristic of a harmonic drive is that it provides a high ratio speed transformation in a very compact concentric mechanism. As illustrated in FIG. 3, the harmonic drive includes an outer ring or housing 61 which is fixed to the frame yoke 13. The inside of the fixed ring 61 is provided with a plurality of teeth which can mesh with corresponding teeth on the exterior of a flexspline 63. The flexspline, however, incorporates fewer teeth than the housing ring, usually two fewer teeth, and the facing teeth engage only where the flexspline 63 is distorted outwardly by a wave generator 65 which is of generally elliptical cross-section rather than circular. As is understood, the flexspline 63 constitutes the low speed element of the speed transforming mechanism and the wave generator 65 constitutes the high speed element. To effect the desired increase in speed in the bicycle of the present invention, the wave generator 65 is connected to the driving wheel axle through the axle extension 53 while the flexspline is connected to the rocking column 31. This latter connection is provided by an annular cap 67 which is bolted to the base of the flexspline 63, as illustrated.

As indicated previously, the connection from the wave generator 65 to the hub of the driving wheel is through a one-way drive or ratchet as is conventional. Thus, driving force is applied to the rear wheel only as the cyclist presses back against the seat 41 and the forward motion of the rocking column is essentially a free or unloaded movement.

The rear stop 33 is positioned in such a way that a predetermined angle forward from the vertical is always preserved. Because of this angle, the weight of the cyclist sitting on the saddle and that of the saddle itself develops a torque about the rear wheel axis. This torque tends to rotate the column forward to forward stop 35 which limits the rotation.

To ride a bicycle according to the present invention, a cyclist sits on the saddle while it is in the forward position and supports his feet against a footrest 25. The distance between the saddle and the footrest should be adjusted to provide a comfortable, bended knee position. By then unbending his knees, the cyclist presses his back against the saddle driving it toward the stop 33. During that motion, the rocking column drives the flexspline in one direction while, at the same time, rotating the wave generator 65 forward. As indicated previously, this rotation, at higher speed, is coupled to the hub of the driving wheel 15. Since the harmonic drive provides a very high speed transformation ratio, e.g. 60 to 1, a short powerful motion can provide a quite high speed. Further, such a short powerful motion is advantageously developed using a wide variety of muscles.

While the driving arrangement of the present invention has been described with particular reference to a traveling bicycle, it should be understood that such an arrangement could also be advantageously applied to an exercise bicycle. In such case, the steerable wheel may be omitted and a suitable drag can be applied to the driving wheel.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A bicycle comprising:
    a driving wheel mounted on an axle;
    an elongate frame provided at one end with a yoke for receiving the axle of the driving wheel;
    a steerable wheel mounted at the other end of said frame;
    a rocking column pivotally mounted on said frame for rotating around an axis concentric with said driving wheel axle;
    a seat mounted on said column; and
    concentric speed transforming means having a high speed element connected to said driving wheel and low speed element connected to said rocking column, whereby force exerted on the rocking column in the rearward direction is transmitted to the diving wheel and transformed into forward motion and the angular speed of the rocking column is multiplied by the concentric speed transforming means to an increased angular speed of the driving wheel that is more than an order of magnitude greater than the angular speed of the rocking column.

2. A bicycle as set forth in claim 1 wherein said speed transforming means is a harmonic device.

3. A bicycle as set forth in claim 1 further comprising stops for limiting the angle of rocking of said column.

4. A bicycle as set forth in claim 1 wherein said high speed element is coupled to the hub of said driving wheel through a one way drive so that force is transmitted to the driving wheel only to rotate in the forward direction when the rocking column is pushed back by the rider.

5. A bicycle as set forth in claim 1 wherein the force exerted on the rocking column in the rearward direction is transformed into forward motion whereby the angular speed of the driving wheel is increased on the order of about 60 times the angular speed of the rocking column.

6. A bicycle as set forth in claim 5 wherein the speed transforming means is a harmonic device.

* * * * *